Inventor:
Lawrence C. Whitman,
by Ernest H. C. Britton
His Attorney.

United States Patent Office 2,702,374
Patented Feb. 15, 1955

2,702,374

SPACER MEMBER FOR ELECTRICAL COILS

Lawrence C. Whitman, Pittsfield, Mass., assignor to General Electric Company, a corporation of New York Application March 16, 1951, Serial No. 215,930

2 Claims. (Cl. 336—185)

This invention relates to spacer members for electrical coils and, more particularly, to a duplex spacer which provides both radial and axial spacing for electrical coils.

In the construction of electrical induction apparatus, it is often necessary to provide radially-extending spacing means between adjacent coil layers and also axially-extending spacing means to radially separate the electrical coils from insulating members, such as insulating cylinders. Thus, for example, in a stationary electrical induction apparatus utilizing a plurality of disk or pancake-type windings which are stacked in superposed relation to one another, it is general practice to provide radially-extending spacer members at spaced-apart intervals around the periphery of the coil structure to provide spacing between adjacent superposed coil layers. Also, in such stationary electrical induction apparatus structures, it is common to use axially-extending spacer members which provide a radial separation between the disk or pancake-type coils and adjacent insulating cylinders which are displaced from the disk or pancake-type coils in a radial direction. So far as I know, the practice in the art heretofore has been to provide separate spacer members for spacing in an axial and radial direction. The axial and radial spacing which such spacer members provide permits circulation of cooling fluid, either liquid or gas, through the axial and radial ducts formed by the use of the spacer members.

It is an object of this invention to provide a new and improved type of spacer member for use with electrical coils which will combine in one structure a radial and axial spacing function which has heretofore been provided by separate spacer members.

In accordance with this objective, my invention provides a new and improved spacer member for use with electrical coils. My spacer has a radially-extending portion and an axially-extending portion, with the axially-extending portion being offset from the center-line of the radially-extending portion in order to permit an interfitting or nesting relation between adjacent spacer members.

Figure 1:
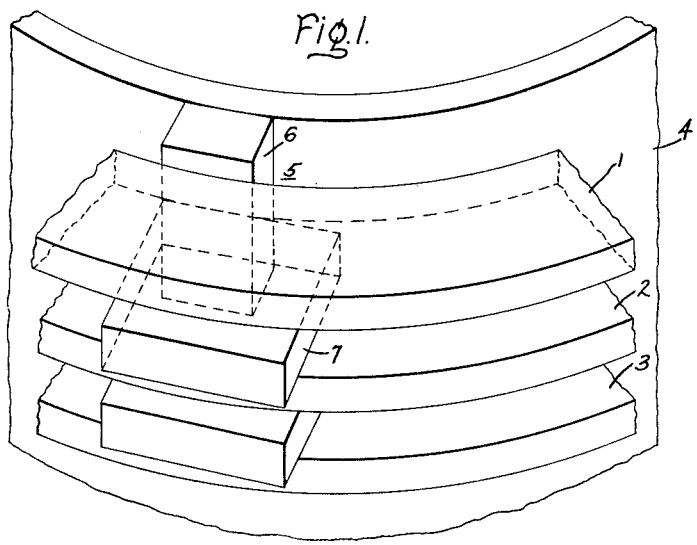
Figure 2:
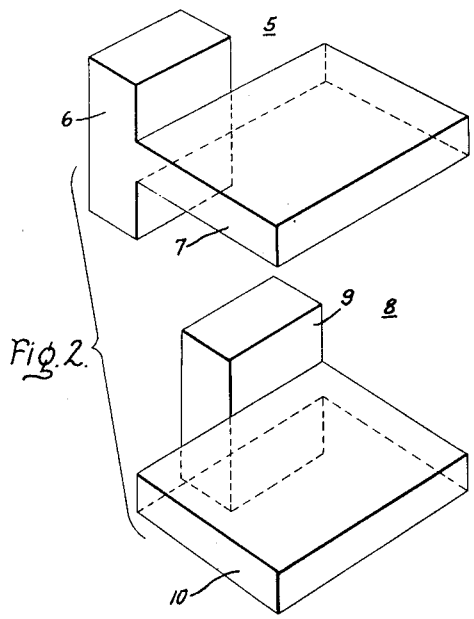

The features of this invention which I believe to be novel are set forth with particularity in the appended claims. My invention itself, however, both as to its organization and use, together with further objects and advantages thereof, may best be understood by reference to the following description taken in connection with the accompanying drawing, in which Fig. 1 represents a view of a coil structure incorporating the spacer member of my invention, the view being taken looking radially inwardly; Fig. 2 is a perspective view of two adjacent spacer members in accordance with my invention; while Fig. 3 is a front elevation view of a coil structure using my spacer members.

Figure 3:
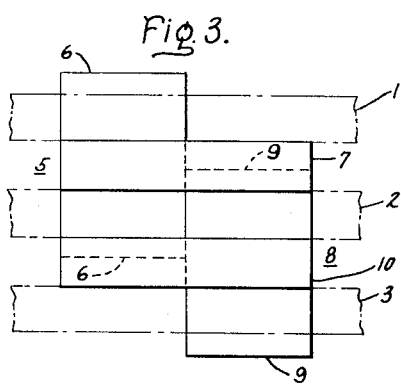

Referring now to the drawing, and more particularly to Figs. 1 and 3, there are shown a plurality of superposed disk or pancake-type coils 1, 2, and 3. Positioned radially inwardly of disk coils 1, 2, and 3 is an insulating cylinder 4. In order to provide a separation in an axial direction between disk coils 1, 2, and 3, with respect to one another, and in a radial direction between disk coils 1, 2, and 3 and insulating cylinder 4, I provide in accordance with my invention a spacer member 5, having an axially-extending portion 6 and a radially-extending portion 7. Both axially-extending spacer portion 6 and radially-extending spacer portion 7 also extend circumferentially or perimetrically of the coil members. The axially-extending portion 6 of spacer member 5 provides a radial separation between the radially innermost edges of disk coils 1, 2, and 3 and the radially outermost surface of insulating cylinder 4. The radially-extending portion 7 of spacer member 5 provides a separation in an axial direction between adjacent superposed disk coils.

Referring now to Fig. 2, there is shown a detailed view of two adjacent spacer members 5 and 8. It will be noted that the axially-extending portion 6 and the radially-extending portion 7 of spacer member 5 are rigidly connected together in such manner as to be one integral piece. A spacer member 5 may be constructed of any suitable insulating material, such as, for example, porcelain or a suitable plastic material. The radially-extending portion and axially-extending portion are mutually perpendicular, with the radially extending portion 7 being centrally located with respect to the axial dimension of portion 6. However, in accordance with my invention, the axially-extending portion 6 is offset with respect to the radially-extending spacer portion 7, so that axial portion 6 lies to one side of the center line of the dimension of spacer portion 7 which extends circumferentially or perimetrically of the disk coils. Due to this arrangement, adjacent spacer members may interfit or nest with respect to one another, and there is no necessity to have "right" and "left" spacer members, since a single spacer member such as spacer 5 is merely reversed in order to provide adjacent spacer 8. Thus, spacer 8, shown in Fig. 2, is the same as spacer 5, and is obtained by shifting spacer 5 180 degrees. With respect to the view shown in Fig. 2, axially-extending element 6 of spacer 5 is on the left-hand side of spacer 5, whereas axially-extending element 9 of spacer member 8 is on the right-hand side of spacer 8. When spacers 5 and 8 are positioned in superposed relation to one another, it can be seen that the two respective axially-extending portions of the respective spacer members will not interfere with one another but will instead be in an interfitting relation, since the adjacent axially-extending portions are on opposite sides of the respective spacer center-lines.

As has been explained, spacer members which are axially adjacent have their respective axially-extending portions on opposite sides of the center-line of the circumferentially-extending dimension of the respective spacers. Alternate spacers have their respective axially-extending portions on the same side of the center-line of the respective spacers. The length of the axially-extending portion extending either above or below the surface of a given radially-extending portion should be so adjusted that it does not exceed half the distance between alternate radially-extending portions.

Spacer members constructed in accordance with my invention provide a large surface area of support for the electrical coils with which they are used. For example, a coil lying between spacer members 5 and 8 is supported by the upper surface of radially-extending portion 10 of spacer 8, by the upper portion of axially-extending member 9 of spacer 8, and also by the lower portion of axially-extending portion 6 of spacer 5.

As has been mentioned before, spacer members constructed in accordance with my invention may be constructed of a suitable plastic or ceramic material, if desired. The use of my construction permits one moulded spacer member instead of the use of conventional radial spacers in combination with long axial spacer members. Furthermore, my spacer is reversible, as has been hereinbefore described, so that one type of spacer member may be used for both left and right positions.

When all of the coils and spacer members have been assembled in position, any suitable clamping means may be applied to provide axial clamping of the completed coil and spacers.

My spacer members may be used either with liquid-cooled stationary electrical induction apparatus or with dry-type stationary electrical induction apparatus.

While there has been shown and described a particular embodiment of my invention, it will be obvious to those skilled in the art that changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In an electrical winding of the type having a plurality of annular disk-type coil layers stacked in superposed relation about an insulating cylinder, means for axially spacing said layers from each other and radially spacing said layers from said insulating cylinder comprising two identical spacer members, each of said members having a radially and peripherally extending portion extending radially and peripherally of said layers and an axially extending portion extending substantially parallel to the axis of said layers and cylinder, said radially and peripherally extending portion and said axially extending portion being substantially perpendicular to each other, said radially and peripherally extending portion being centrally located along the axial length of said axially extending portion, each of said radially and peripherally extending portions positioned between one of said layers and an immediately adjacent layer on opposite sides of said one layer, said axially extending portions positioned radially between said one and immediately adjacent layers and said cylinder and terminating at their opposite ends axially beyond said one layer and one of said immediately adjacent layers, said radially and peripherally extending portions being superposed with respect to each other, said axially extending portions having a peripheral width in a peripheral direction substantially equal to one-half of the peripheral width in a peripheral direction of the radially inner edges of said radially and peripherally extending portions, said axially extending portions positioned entirely on opposite sides of the centers of said radially inner edges.

2. In an electrical winding of the type having a plurality of annular disk-type coil layers stacked in superposed relation about an insulating cylinder, means for axially spacing said layers from each other and radially spacing said layers from said insulating cylinder comprising two identical spacer members, each of said members having a radially and peripherally extending portion extending radially and peripherally of said layers and an axially extending portion extending substantially parallel to the axis of said layers and cylinder, said radially and peripherally extending portion and said axially extending portion being substantially perpendicular to each other, said radially and peripherally extending portion being centrally located along the axial length of said axially extending portion, each of said radially and peripherally extending portions positioned between one of said layers and an immediately adjacent layer on opposite sides of said one layer, each of said axially extending portions positioned radially between said one layer and one of said immediately adjacent layers and said cylinder and terminating at their opposite ends axially beyond said one layer and one of said immediately adjacent layers, said radially and peripherally extending portions being superposed with respect to each other, said axially extending portions having a peripheral width in a peripheral direction substantially equal to one half of the peripheral width in a peripheral direction of the radially inner edges of said radially and peripherally extending portions, said axially extending portions positioned entirely on opposite sides of the centers of said radially inner edges whereby an axially extending portion terminating end of one of said members is disposed opposite the radially inner edge of the radially and peripherally extending portion of the other of said members and an axially extending portion terminating end of said other member is disposed opposite the radially inner edge of the radially and peripherally extending portion of said one member.

References Cited in the file of this patent

UNITED STATES PATENTS

| Number | Name | Date |
|---|---|---|
| 1,747,953 | Roothaan | Feb. 18, 1930 |
| 2,467,804 | Beymer | Apr. 19, 1949 |
| 2,571,418 | Castenschiold | Oct. 16, 1951 |